United States Patent [19]

Mashikian

[11] Patent Number: 4,502,000
[45] Date of Patent: Feb. 26, 1985

[54] DEVICE FOR BALANCING PARALLEL STRINGS

[75] Inventor: Matthew S. Mashikian, Storrs, Conn.

[73] Assignee: Energy Development Associates, Inc., Madison Heights, Mich.

[21] Appl. No.: 515,348

[22] Filed: Jul. 19, 1983

[51] Int. Cl.³ .......................... H02J 3/32; H02J 7/00
[52] U.S. Cl. ........................................ 320/6; 307/48; 307/53; 320/15; 320/18; 363/90
[58] Field of Search ...................... 429/11, 13, 61, 90; 320/39, 13, 23, 14, 15–19, 6; 307/52–62; 363/90, 69, 70

[56] References Cited

U.S. PATENT DOCUMENTS

| | | | |
|---|---|---|---|
| 2,949,568 | 8/1960 | Dortort | 317/26 |
| 2,994,028 | 7/1961 | Dortort | 363/70 |
| 3,013,200 | 12/1961 | Dortort | 363/70 |
| 3,042,848 | 7/1962 | Muchnick et al. | 363/90 |
| 3,042,849 | 7/1962 | Dortort | 363/69 |
| 3,956,638 | 5/1976 | Ahrens et al. | 320/23 X |
| 4,061,955 | 12/1977 | Thomas et al. | 320/15 X |
| 4,110,806 | 8/1978 | Murano et al. | 361/4 |
| 4,274,043 | 6/1981 | Heitz | 320/14 X |
| 4,419,723 | 12/1983 | Wilson, Jr. | 363/90 X |

OTHER PUBLICATIONS

"Magnetic Amplifiers" by Herbert F. Storm, Copyright, 1955, General Electric Company.
Article "Introduction to the Theory of Magnetic Amplifiers" (pp. 62–86).
Article "Transient Response of the Saturable Reactor" (pp. 166–169).
Article "Application of Saturable Reactors" (pp. 389–410).

Primary Examiner—R. J. Hickey
Attorney, Agent, or Firm—Harness, Dickey & Pierce

[57] ABSTRACT

A battery plant is described which features magnetic circuit means in association with each of the battery strings in the battery plant for balancing the electrical current flow through the battery strings by equalizing the voltage across each of the battery strings. Each of the magnetic circuit means generally comprises means for sensing the electrical current flow through one of the battery strings, and a saturable reactor having a main winding connected electrically in series with the battery string, a bias winding connected to a source of alternating current and a control winding connected to a variable source of direct current controlled by the sensing means. Each of the battery strings is formed by a plurality of batteries connected electrically in series, and these battery strings are connected electrically in parallel across common bus conductors.

17 Claims, 6 Drawing Figures

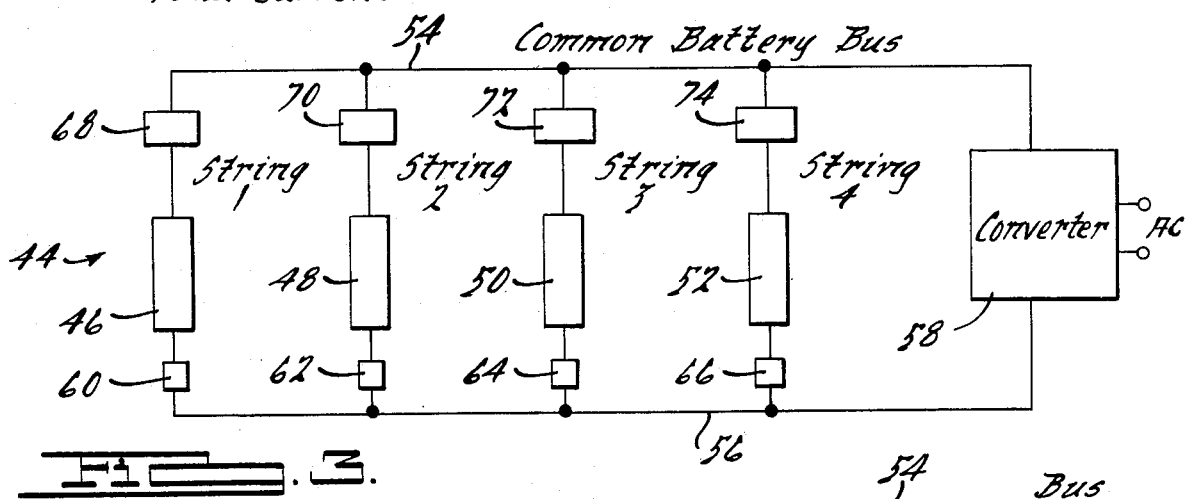
FIG. 3.
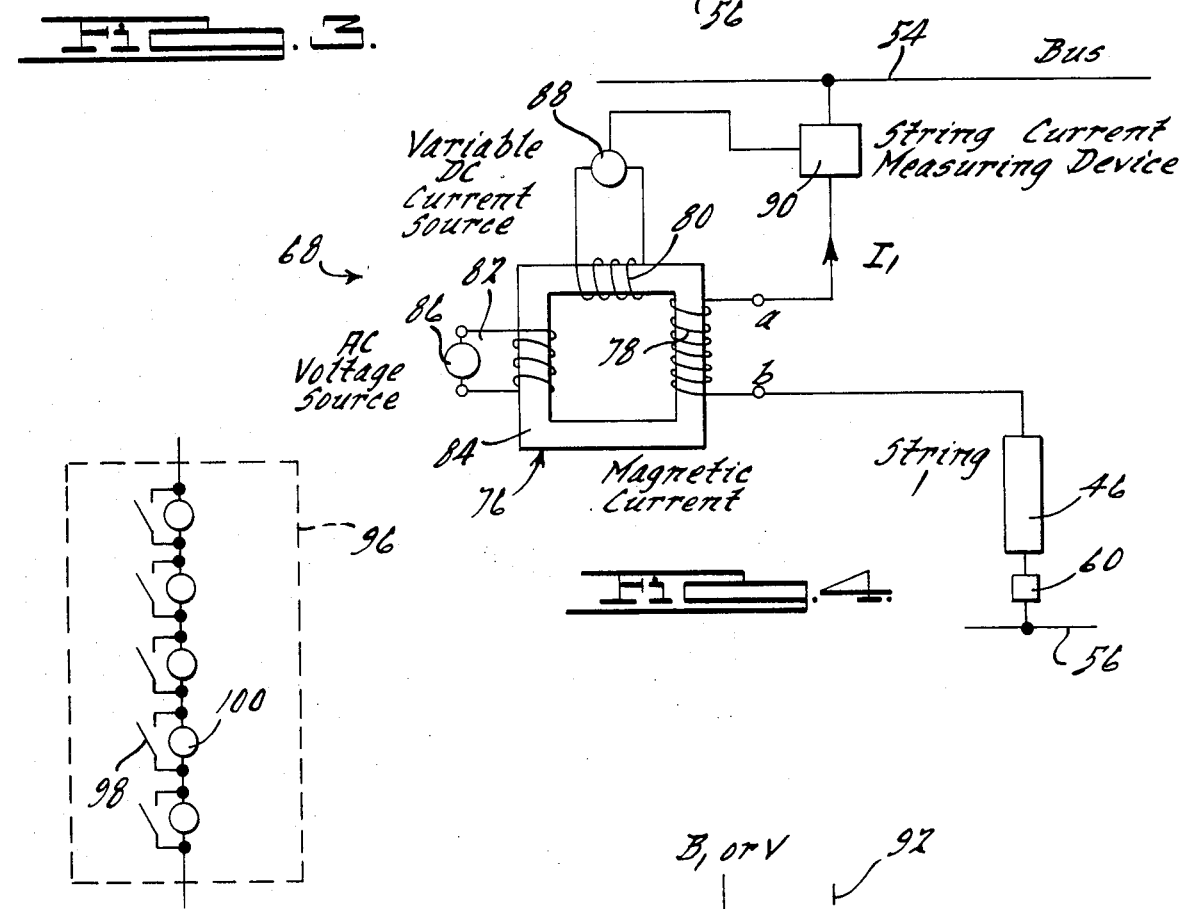
FIG. 4.
FIG. 5.
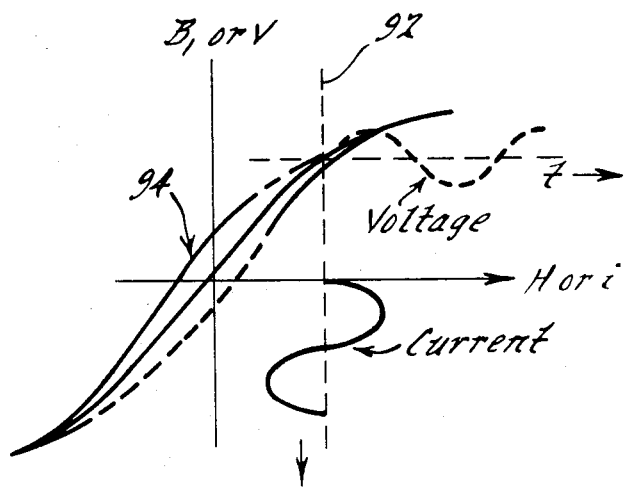
FIG. 6.

DEVICE FOR BALANCING PARALLEL STRINGS

The Government of the United States of America has rights in this invention pursuant to Contract No. DE-AC02-78ET26923/II awarded by the U.S. Department of Energy.

BACKGROUND AND SUMMARY OF THE INVENTION

The present invention relates generally to electrochemical cells, and particularly to zinc-chlorine batteries combined to form a battery plant system.

Due to the increasing demand for electricity and the decreasing availability (and increasing cost) of distillate oil and natural gas, the need has arisen for an alternate method of supplying peak demand electricity. Presently, the electricity generated for peak demand is supplied from diesel engines and combustion turbines, which are fired by distillate oil and natural gas. One such method is the use of secondary energy storage batteries to store electricity generated from utility baseload facilities during the night or off-peak hours, and discharging these batteries during the hours of peak demand. Secondary energy storage batteries currently being considered for this application include lead-acid, lithium-iron sulfide, sodium sulfur, sodium-chloride, and zinc-chlorine batteries. In order to be utilized in this application, these batteries would necessarily have to be scaled up to battery plants capable of delivering electrical energy on the order of 100 mega-watt hours in a single discharge. This scale up would generally be achieved by combining large numbers of cells into module-type units, and interconnecting a suitable number of these modules.

One of the primary concerns in such a scale up, is the reliability of the battery plant. This reliability may generally be characterized as a function of the number of battery module failures. Since these modules would usually be connected electrically in series to form battery strings, the failure of a single module will affect the operation of the entire string. If the failure is such that the battery string must be disconnected from the electrical current flow in the battery plant, this has the effect of the failure of all of the battery remaining battery strings.

In the U.S. Pat. No. 4,287,267, this current imbalance problem was resolved by providing a separate converter bridge for each battery string so that variations in a battery string voltage could be compensated for by changing the thyristor firing angles. However, in accordance with the present invention, a magnetic technique is employed to balance the electrical current flow through the battery strings which does not require the provision of separate converter bridges for each battery string.

Although the description below is directed specifically to zinc-chloride batteries, the present invention may also be utilized with other types of metal-halogen batteries and electrochemical systems which employ a plurality of battery strings which are connected electrically in parallel. With general reference to metal-halogen battery systems, these battery systems are generally comprised of three basic components, namely an electrode stack section, an electrolyte circulation subsystem, and a store subsystem. The electrode stack section typically includes a plurality of cells connected together electrically in various series and parallel combinations to achieve a desired operating voltage and current at the battery terminals over a charge/discharge battery cycle. Each cell is comprised of a positive and negative electrode which are both in contact with an aqueous metalhalide electrolyte. The electrolyte circulation subsystem operates to circulate the metalhalide electrolyte from a reservoir through each of the cells in the electrode stack in order to replenish the metal and halogen electrolyte ionic components as they are oxidized or reduced in the cells during the battery cycle. In a closed, self-contained metal-halogen battery system, the storage subsystem is used to contain the halogen gas or liquid which is liberated from the cells during the charging of the battery system for subsequent return to the cells during the discharging of the battery system. In the modules in the string.

A bypass switch for redirecting electrical current around a failed battery module is described in the commonly assigned U.S. Pat. No. 4,287,267, entitled "Zinc-Chlorine Battery Plant System And Method", issued on Sept. 1, 1981 to Whittlesey et al., which is hereby incorporated by reference. This bypass switch permits only the failed battery module or modules to be effectively removed from the battery string by short circuiting the electrical power terminals of the failed modules(s).

Accordingly, the provision of a bypass switch in association with each battery module in the battery plant considerably enhances the reliability of the battery plant by enabling the battery string containing a failed module to continue to charge or discharge with the other battery strings. However, the removal of one or more battery modules in this way will give rise to an undesirable electrical current balance between the battery strings which are connected electrically in parallel by virtue of the lower voltage across the battery string having the failed module with respect to the voltages across the other battery strings. For example, if each battery string contained 20 battery modules each operating at 50 volts, the normal voltage across a battery string would be 1000 volts. If one of the battery modules failed and was removed from the battery string via a bypass switch, the instantaneous voltage of the battery string affected would be 950 volts. However, since all of the battery strings are connected electrically in parallel, a redistribution of the electrical current flow through the battery strings would automatically result in an effort to equalize the voltage across each of the battery strings. This redistribution of electrical current flow would mean a significant increase in the current flow in the battery string having the failed battery module with a concomitant decrease in the current flow through the zinc-chloride battery system, chlorine gas is liberated from the positive electrodes of the cells and stored in the form of chlorine hydrate. Chlorine hydrate is a solid which is formed by the store subsystem in a process analogous to the process of freezing water where chlorine is included in the ice crystal.

With reference to the general operation of a zinc-chloride battery system, an electrolyte pump operates to circulate the aqueous zinc-chloride electrolyte from a reservoir to each of the positive or "chlorine" electrodes in the electrode stack. These chlorine electrodes are typically made of porous graphite, and the electrolyte passes through the pores of the chlorine electrodes into a space between the chlorine electrodes and the opposing negative or "zinc" electrodes. The electrolyte then flows up between the opposing electrodes or otherwise out of the cells in the electrode stack and back to the electrolyte reservoir or sump.

During the charging of the zinc-chloride battery system, zinc metal is deposited on the zinc electrode substrates and chlorine gas is liberated or generated at the chlorine electrode. The chlorine gas is collected in a suitable conduit, and then mixed with a chilled liquid to form chlorine hydrate. A gas pump is typically employed to draw the chlorine gas from the electrode stack and mix it with the chilled liquid, (i.e., generally either zinc-chloride electrolyte or water). The chlorine hydrate is then deposited in a store container until the battery system is to be discharged.

During the discharging of the zinc-chloride battery system, the chlorine hydrate is decomposed by permitting the store temperature to increase, such as by circulating a warm liquid through the store container. The chlorine gas thereby recovered is returned to the electrode stack via the electrolyte circulation subsystem, were it is reduced at the chlorine electrodes. Simultaneously, the zinc metal is dissolved off of the zinc electrode substrates, and power is available at the battery terminals.

Over the course of the zinc-chloride battery charge/discharge cycle, the concentration of the electrolyte varies as a result of the electrochemical reactions occurring at the electrodes in the cells of the electrode stack. At the beginning of charge, the concentration of zinc-chloride in the aqueous electrolyte may typically be 2.0 molar. As the charging portion of the cycle progresses, the electrolyte concentration will gradually decrease with the depletion of zinc and chloride ions from the electrolyte. When the battery system is fully charged, the electrolyte concentration will typically be reduced to 0.5 molar. Then, as the battery system is discharged, the electrolyte concentration will gradually swing upwardly and return to the original 2.0 molar concentration when the battery system is completely or fully discharged.

Further discussion of the structure and operation of zinc-chloride battery systems may be found in the following commonly assigned patents: Symons U.S. Pat. No. 3,713,888 entitled "Process For Electrical Energy Using Solid Halogen Hydrates"; Symons U.S. Pat. No. 3,809,578 entitled "Process For Forming And Storing Halogen Hydrate In A Battery"; Carr et al. U.S. Pat. No. 3,909,298 entitled "Batteries Comprising Vented Electrodes And Method of Using Same"; Carr U.S. Pat. No. 4,100,332 entitled "Comb Type Bipolar Electrode Elements And Battery Stack Thereof". Such systems are also described in published reports prepared by the assignee herein, such as "Development of the Zinc-Chloride Battery for Utility Applications", Interim Report EM-1417, May 1980, and "Development of the Zinc-Chloride Battery for Utility Applications", Interim Report EM-1051, April 1979, both prepared for the Electric Power Research Institute, Palo Alto, Calif. A further description may be found in the commonly assigned U.S. co-pending patent application entitled "A Hydrogen Gas Relief Valve" by Curtis C. Whittlesey, filed on July 8, 1983, Ser. No. 510,401. An additional technique for resolving the current imbalance problem is also disclosed in the commonly assigned U.S. patent application Ser. No. 515,351, entitled "Current Balancing For Battery Strings" by James H. Galloway, which was filed on even date herewith. The specific teachings of the aforementioned cited references are incorporated herein by reference.

It is a principal object of the present invention to provide an apparatus and method of balancing the electrical current flow through a plurality of battery strings which are connected electrically in parallel across common bus conductors and in which each of the battery strings is formed by a plurality of batteries connected electrically in series.

It is another objective of the present invention to provide a battery plant which will magnetically control the voltage across the common bus conductors for each battery string.

It is a further objective of the present invention to provide a battery plant which will magnetically prevent a redistribution of the electrical current flow through the battery strings in response to a failed battery in one or more of the battery strings.

It is an additional objective of the present invention to provide a battery plant which will magnetically prevent a redistribution of the electrical current flow through the battery strings in response to the removal of one or more batteries from a battery string.

It is yet another objective of the present invention to provide a battery plant which is capable of magnetically forcing the electrical current through a battery string to the point where an alternating circuit breaker may be employed to disconnect the battery string from the battery plant.

To achieve the foregoing objectives, the present invention provides a battery plant which features magnetic circuit means in association with each of the battery strings in the battery plant for balancing the electrical current flow through the battery strings by equalizing the voltage across each of the battery strings. Each of the magnetic circuit means generally comprises means for sensing the electrical current flow through one of the battery strings, and a saturable reactor having a main winding connected electrically in series with the battery string, a bias winding connected to a source of alternating current and a control winding connected to a variable source of direct current controlled by the sensing means.

Additional advantages and features for the present invention will become apparent from a reading of the detailed description of the preferred embodiments which make reference to the following set of drawings in which:

BRIEF DESCRIPTION OF THE DRAWINGS

FIG. 3 is a block diagram of a battery plant in accordance with the present invention.

FIG. 4 is a schematic diagram of one of the magnetic circuits shown in FIG. 3.

FIG. 5 is a graph illustrating the operation of the magnetic circuit shown in FIG. 4.

FIG. 6 is a schematic representation of a zinc-chloride battery string employing a bypass switch for each battery module in the battery string.

DETAILED DESCRIPTION OF THE PREFERRED EMBODIMENTS

Figure 1:
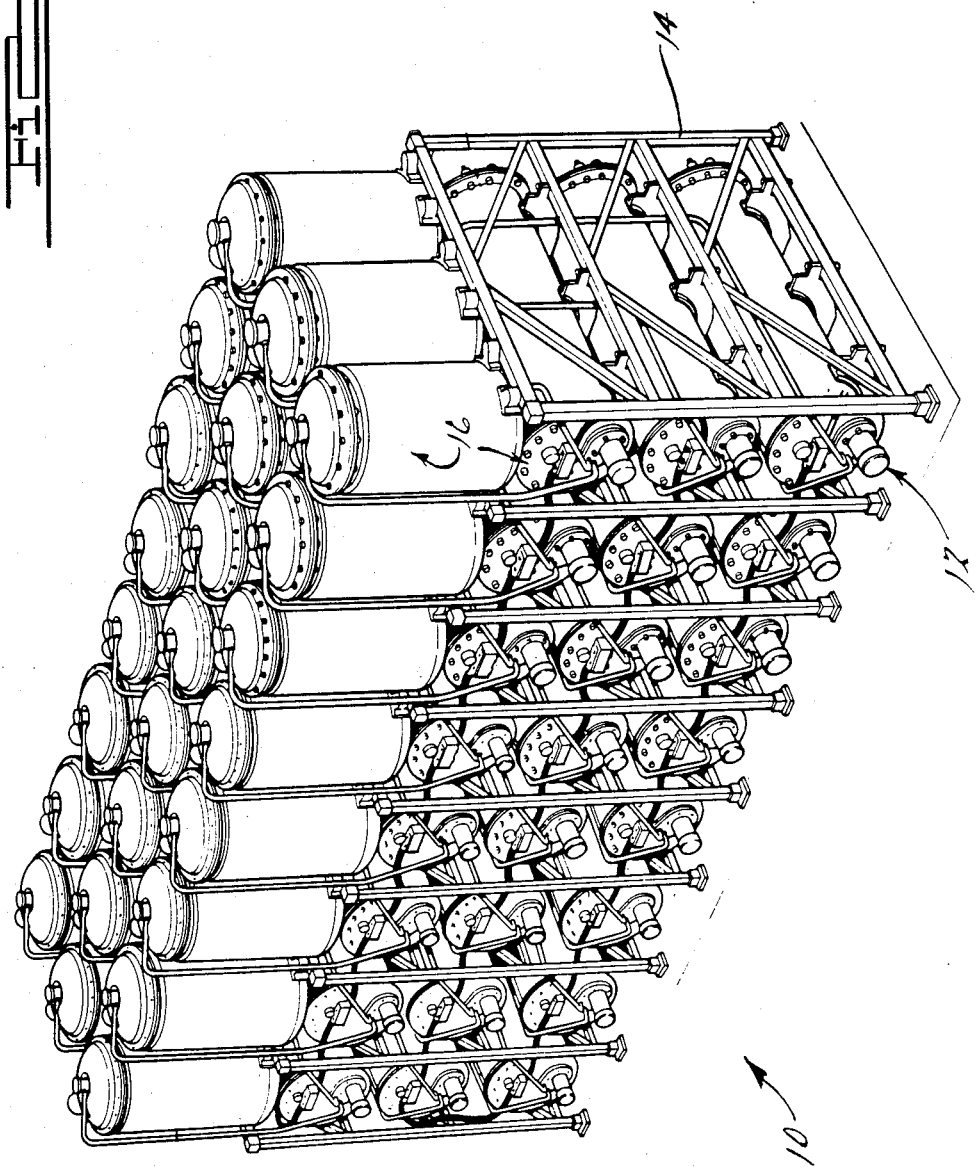
FIG. 1 is a perspective view of a zinc-chloride battery string for a battery plant in accordance with the present invention.

Referring to FIG. 1, a perspective view of a zinc-chloride battery string 10 is shown. The battery string 10 is generally comprised of twenty four zinc-chloride battery modules 12 connected electrically in series and mounted on a rack structure 14 in a three tier arrangement. Each of the battery modules 12 are comprised of two interconnected cylindrical vessels, as may best be seen with reference to FIG. 2.

Figure 2:
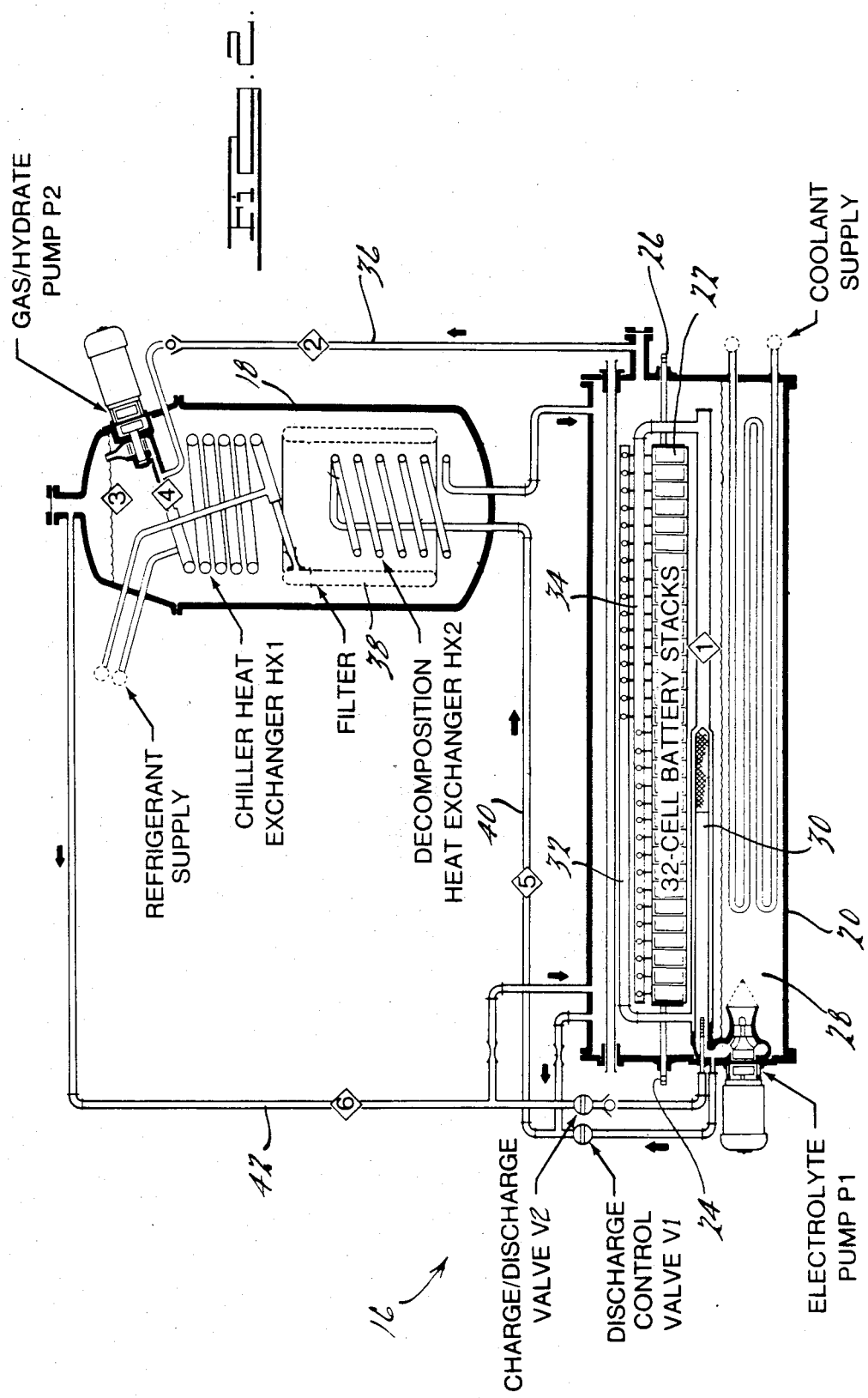
FIG. 2 is a schematic diagram of one of the zinc-chloride battery modules shown in FIG. 1.

FIG. 2 illustrates a schematic diagram of a zinc-chloride battery module 16 which forms part of the battery string 10. The upper vessel or case 18 is used to contain the chlorine hydrate store subsystem, while the lower vessel or case 20 is used to contain both the battery stack and the electrolyte circulation subsystem. The battery stack is comprised of two submodules 22 which each include thirty-two unit cells connected electrically in series. Only one of the submodules 22 is shown in FIG. 2 due to the fact that these submodules are physically aligned in parallel within the vessel 20. Terminals 24 and 26 are mounted to each of the submodules 22 in order to permit suitable external electrical connections to be made to the battery stack of the battery module 16. For example, the two submodules 22 may be connected electrically in parallel to provide an open circuit voltage of approximately sixty-eight volts for the battery module 16.

During the charging and discharging of the battery module 16, the electrolyte circulation subsystem provides a continuous supply of electrolyte to all of the cells contained in the battery stack submodules 22. Electrolyte is drawn from a reservoir or sump 28 by the electrolyte pump "P1", and pumped through a main manifold 30 to a pair of distribution conduits 32-34 for each submodule 22. Each of the distribution conduits 32-34 is designed to evenly distribute the zinc-chloride electrolyte to one half of the unit cells in the submodule. The unit cells then become quickly filled with electrolyte and overflow through a serpentine electrolyte return channel (not shown) back to the sump 28.

During the charging of the battery module 16, the submodules will generate chlorine gas which will be drawn through a conduit 36 to the hydrate store subsystem in the vessel 18 by the gas pump "P2". The gas pump P2 also mixes the chlorine gas with a liquid (preferably water in this embodiment) which has been chilled via heat exchanger "HX1". The output from the gas pump P2 is typically a chlorine hydrate slurry which gradually becomes compacted by virtue of the fact that the excess liquid in the slurry is drawn by the gas pump P2 through the filter 38.

During the discharge of the battery module 16, discharge control valve "V2" is opened, which permits warm electrolyte from the sump 28 to circulate through the decomposition heat exchanger "HX2" in the vessel 18 via conduit 40. The heat from the electrolyte is thereby transferred to the chlorine hydrate and causes the chlorine hydrate to gradually decompose. The discharge valve "V1" is also opened to permit the chlorine gas which is liberated from the decomposing hydrate to be conveyed through conduit 42 to the electrolyte circulation subsystem in the vessel 20. The chlorine gas is then injected into the main manifold 30, where it is dissolved and conveyed back to the unit cells of the submodules 22.

Referring to FIG. 3, a block diagram of a battery plant 44 in accordance with the present invention is shown. The battery plant 44 includes four battery strings 46-52 which are generally connected electrically in parallel across common bus conductors 54 and 56. The common bus conductors 54 and 56 are connected to a conventional converter 58 which provides the power conditioning equipment required for the battery plant 44. During the charging of the battery plant 44, the converter 58 converts A.C. electrical power from a utility grid system to D.C. electrical power on the bus conductors 54 and 56. Similarly, during the discharging of the battery plant 44, the D.C. electrical power generated by the battery strings 46-52 is converted to A.C. electrical power for use on the utility grid system, such as during the hours of peak demand.

The battery plant 44 also includes a circuit breaker for each of the battery strings 46-52. These circuit breakers 60-66 are used for interrupting the D.C. electrical power being transmitted to or from the battery strings 46-52. However, in accordance with the present invention, these circuit breakers 60-66 may be of the type normally used to interrupt the transmission of A.C. electrical power.

The battery plant 44 further includes a magnetic circuit in association with each of the battery strings 46-52 for balancing the D.C. electrical current flow through the battery strings. These magnetic circuits 68-74 are adapted to balance the electrical current flow through the battery strings 46-52 by equalizing the voltages across the common bus conductors 54 and 56 for each of the battery strings 46-52.

A schematic diagram of one of the magnetic circuits 68-74 is shown in FIG. 4. The heart of each magnetic circuit is a saturable reactor 76. The saturable reactor includes a main winding 78, a control winding 80 and a bias winding 82 which are each wound around an iron core 84. The main winding 78 is connected electrically in series with the battery string 46. The bias winding 82 is connected to a suitable A.C. voltage source 86 to create an alternating flux through the core 84. The control winding 80 is connected to a variable D.C. current source 88 which is used to change the degree of saturation in the core 84.

The magnetic circuit 68 also includes a sensor 90 for measuring the direct current flow, $I_1$, through the battery string 46. The sensor 90 is connected to the variable D.C. current source 88 such that the current flow from the current source 88 (and hence the current flow through the control winding 80) will be a function of the current measured by the sensor 90. Accordingly, it will be appreciated that the degree of saturation of the magnetic flux density in the core 84 will be controlled by the amount of electrical current flowing through the battery string 46. Thus, the D.C. current flow through control winding 80 controls the inductive reactance of the core 84, which will vary in response to a change in the magnitude of this current flow. In this configuration, the saturable reactor 76 may also be referred to as a "magnetic amplifier" in that a large amount of electrical power from the A.C. voltage source 86 is controlled by a relatively small amount of electrical power from the variable D.C. current source 88.

In operation, the sensor 90 will measure the electrical current flow through the battery string 46 and will cause a predetermined D.C. current flow from the current source 88. This current flow will determine the degree of saturation in the magnetic core 84, and thereby control the voltage across the main winding 78 of the saturable reactor 68 at points "a" and "b". If the current flow through the battery string 46 is increased, this increase will be sensed by the sensor 90 and the current flow through the control winding 80 will be increased in response thereto. This increase in current flow will cause an increase in reactance and the degree of saturation of the core 84, which will result in an increase in the voltage across the main winding 78. This increase in the voltage across the main winding 78 will increase the total voltage across the bus conductors 54 and 56 for the battery string 46, and equalize this voltage with the voltages for the other battery strings.

One example of an increase in current through a battery string is an increase which will result if one of the batteries in the battery string fails and is removed or short circuited such that the voltage for the battery string so affected will decrease with respect to the other battery strings. Since the battery strings 46–52 are connected in parallel across the common bus conductors 54 and 56, such a decrease in the voltage for one of the battery strings will cause a re-distribution of the electrical current flow through the battery strings. This re-distribution will channel a significant current increase through the battery string containing the failed module in an effort to increase the voltage of this battery string to the voltage levels of the other battery strings. In this regard, the magnetic circuits 68–74 will prevent this situation by impressing a voltage in the current branch having the battery string with the failed battery which is equal to the voltage lost by virtue of the failed battery.

The power required to impress this additional voltage via the main winding 78 of the saturable reactor 76 is derived from the A.C. voltage source 86. Preferably, the A.C. voltage source 86 should provide sufficient electrical power to increase the voltage across the main winding 78 to compensate for the failure of at least one battery in the battery string. However, it should be appreciated that it may be desirable to provide sufficient electrical power to compensate for the failure of two batteries, and so forth. For example, if the current flowing through each of the battery strings 46–52 was 200 amps and the voltage across each battery in the battery strings was 50 volts, then for each failed battery, the A.C. voltage source would have to supply 10 kw of electrical power to provide 50 volt increments across the main winding 78.

Referring to FIG. 5, a graphical illustration of the operation of the saturable reactor 76 is presented. As the current through the control coil 80 is varied, the magnetic circuit operating line 92 will move either to the right or left depending upon the direction of the electrical current change. The hysteresis loops, generally designated by reference numeral 94, represent the voltage across the main winding 78 as a function of current. A further explanation of the general operation of saturable reactors when used as magnetic amplifiers may be found in "Magnetic Amplifiers" by H. F. Storm, published by John Wiley & Sons, Inc., 1955, which is hereby incorporated by reference.

Referring again to FIG. 3, it should be noted that the magnetic circuits 68–74 may be so constructed by providing sufficient capacity for the A.C. voltage sources 86 that circuit breakers 60–66 may be constructed from the type normally used to interrupt A.C. electrical power. Thus, one or more of the magnetic circuits 68–74 may be used to force the electrical current flow in a battery string momentarily to zero, in order to permit a inexpensive circuit breaker to the A.C. type to interrupt current flow through the battery string.

Referring to FIG. 6, a schematic representation of a battery string 96 is shown, which features the use of a bypass switch 98 connected across the terminal of each of the batteries 100 in the battery string. Accordingly, FIG. 6 illustrates how a bypass, such as described in the above-identified U.S. Pat. No. 4,287,267, can be used to effectively remove a failed battery by short-circuiting the failed battery. Thus, only the failed battery need be removed from the battery string in order to permit the rest of the batteries in the affected battery string to continue operating.

It should also be noted that magnetic circuits 68–74 in accordance with the present invention require no moving parts. Additionally, these magnetic circuits 68–74 provide for a smooth, continuous and automatic process for balancing the electrical current flow through each of the battery strings 46–52.

The various embodiments which have been set forth above were for the purpose of illustration and were not intended to limit the invention. It will be appreciated by those skilled in the art that various changes and modifications may be made to these embodiments described in this specification without departing from the spirit and scope of the invention as defined by the appended claims.

What is claimed is:

1. In a battery plant having a plurality of battery strings connected electrically in parallel where each of said battery strings is formed by a plurality of batteries connected electrically in series, the improvement comprising:

magnetic circuit means in association with each of said battery strings for balancing the electrical current flow through said battery strings.

2. The invention according to claim 1, wherein said battery strings are connected electrically in parallel across common bus conductors, and said magnetic circuit means balances the electrical current flow through said battery strings by equalizing the voltages across said common bus conductors for each of said battery strings.

3. The invention according to claim 2, wherein each of said magnetic circuit means comprises means for sensing the electrical current flow through one of said battery strings, and a saturable reactor having a main winding connected electrically in series with said battery string, a bias winding connected to a source of alternating current and a control winding connected to a variable source of direct current controlled by said sensing means.

4. The invention according to claim 3, wherein said variable source of direct current is connected to said sensing means such that direct current flow from said variable source of direct current is dependent upon the current flow through said battery string.

5. The invention according to claim 4, wherein the direct current flow through said control winding controls the magnetic flux density in a magnetic core of said saturable reactor, and thereby controls the inductive reactance of said magnetic core and the voltage across said main winding.

6. The invention according to claim 5, wherein said source of alternating current provides the electrical power required to increase the voltage across said main winding to compensate for the failure of at least one battery in said battery string.

7. The invention according to claim 6, wherein each of said batteries in said battery plant includes bypass switching means for redirecting electrical current flow around a failed battery in response to a failure condition.

8. The invention according to claim 5, wherein said variable source of direct current includes means for controlling the flow of direct current through said control winding independently of said sensing means, and said source of alternating current provides the electrical power necessary to substantially decrease the flow of electrical current through said battery string.

9. A battery plant system, comprising:
   power conditioning means for converting alternating current electrical power to direct current electrical power during the charging of said battery plant and converting direct current electrical power to alternating current electrical power during the discharging of said battery plant;
   a plurality of battery strings connected electrically in parallel across common bus conductors to said power conditioning means;
   a plurality of battery modules connected electrically in series to form each of said battery strings;
   bypass switching means, in association with each of said battery modules, for redirecting electrical current flow around a failed battery module in response to a failure condition; and
   magnetic circuit means in association with each of said battery strings for balancing the electrical current flow through said battery strings in response to at least one failed battery module by equalizing the voltages across said common bus conductors for each of said battery strings.

10. The invention according to claim 9, wherein each of said magnetic circuit means comprises means for sensing the electrical current flow through one of said battery strings, and a saturable reactor having a main winding connected electrically in series with said battery string, a bias winding connected to a source of alternating current and a control winding connected to a variable source of direct current controlled by said sensing means.

11. The invention according to claim 10, wherein said variable source of direct current is connected to said sensing means such that direct current flow from said variable source of direct current is dependent upon the current flow through said battery string.

12. The invention according to claim 11, wherein the direct current flow through said control winding controls the magnetic flux density in a magnetic core of said saturable reactor, and thereby controls the inductive reactance of said magnetic core and the voltage across said main winding.

13. The invention according to claim 12, wherein said source of alternating current provides the electrical power required to increase the voltage across said main winding to compensate for the failure of at least one battery in said battery string.

14. The invention according to claim 13, wherein each of said batteries in said battery plant includes bypass switching means for redirecting electrical current flow around a filled battery in response to a failure condition.

15. The invention according to claim 12, wherein said variable source of direct current includes means for controlling the flow of direct current through said control winding independently of said sensing means, and said source of alternating current provides the electrical power necessary to substantially decrease the flow of electrical current through said battery string.

16. The invention according to claim 9, wherein said battery plant system is a zinc-chloride battery plant system.

17. A method of balancing the electrical current flow through a plurality of battery strings which are connected electrically in parallel and in which each of said battery strings is formed by a plurality of batteries connected electrically in series, comprising the steps of:
   providing a saturable reactor in association with each of said battery strings such that each of said saturable reactors has a main winding connected electrically in series with one of said battery strings;
   sensing the electrical current flow through each of said battery strings; and
   controlling the magnetic flux density through a magnetic core of each of said saturable reactors such that the voltages across each of said main windings equalizes the voltages across common bus conductors for each of said battery strings.

* * * * *